(12) United States Patent
Busche (10) Patent No.: US 7,660,459 B2
(45) Date of Patent: Feb. 9, 2010

(54) METHOD AND SYSTEM FOR PREDICTING CUSTOMER BEHAVIOR BASED ON DATA NETWORK GEOGRAPHY

(75) Inventor: Frederick D. Busche, Highland Village, TX (US)

(73) Assignee: International Business Machines Corporation, Armonk, NY (US)

( * ) Notice: Subject to any disclaimer, the term of this patent is extended or adjusted under 35 U.S.C. 154(b) by 1971 days.

(21) Appl. No.: 09/879,491

(22) Filed: Jun. 12, 2001

(65) Prior Publication Data

US 2002/0188507 A1 Dec. 12, 2002

(51) Int. Cl.
*G06E 1/00* (2006.01)
*G06K 9/00* (2006.01)

(52) U.S. Cl. .......................... 382/155; 706/21; 706/25; 705/14

(58) Field of Classification Search ................. 382/155, 382/168; 705/14, 26
See application file for complete search history.

(56) References Cited

U.S. PATENT DOCUMENTS

| | | | | |
|---|---|---|---|---|
| 5,537,488 | A * | 7/1996 | Menon et al. | 382/170 |
| 5,835,087 | A | 11/1998 | Herz et al. | 345/327 |
| 5,920,852 | A * | 7/1999 | Graupe | 706/26 |
| 6,073,112 | A | 6/2000 | Geerlings | 705/14 |
| 6,099,319 | A | 8/2000 | Zaltman et al. | 434/236 |
| 6,134,532 | A | 10/2000 | Lazarus et al. | 705/14 |
| 6,393,479 | B1 * | 5/2002 | Glommen et al. | 709/224 |
| 6,643,696 | B2 * | 11/2003 | Davis et al. | 709/224 |
| 6,741,967 | B1 * | 5/2004 | Wu et al. | 705/10 |
| 6,842,782 | B1 * | 1/2005 | Malik et al. | 709/224 |

OTHER PUBLICATIONS

Vellido, A.; Lisboa PJG; Meehan, K., *Quantitative Characterization and Prediction of On-Line Purchasing Behavior: A Latent Variable Approach*, International Journal of Electronic Commerce, vol. 4, No. 4, pp. 83-104, Summer 2000, Abstract.
Komatsubara, S.; Suzuki, R.; Mogi, K.; Mikami, H., *Internet Traffic Analysis Based on Chaos Attractors*, NTT R & D, vol. 47, No. 3, pp. 341-346, 1998, Abstract.
Tauscher, L.; Greenberg, S., *How People Revisit Web Pages: Empirical Findings and Implications for the Design of History Systems*, International Journal of Human-Computer Studies, vol. 47, No. 1, pp. 97-137, Jul. 1997, Abstract.

* cited by examiner

*Primary Examiner*—Daniel Lastra
(74) *Attorney, Agent, or Firm*—Yee & Associates, P.C.; John R. Pivnichny (57) ABSTRACT

A method and system for predicting customer behavior based on the geography of a data network are provided. Furthermore, a method and system for evaluating the training of a predictive algorithm to determine if the algorithm does not adequately take into consideration the influences of data network geography are also provided. The method and system generate frequency distributions of a customer database data set, training data set and testing data set and compare the frequency distributions of data network geographical characteristics to determine if there are discrepancies. If the discrepancies are above a predetermined tolerance, one or more of the data sets may not be representative of the customer database taking into account data network geographical influences on customer behavior. Thus, recommendations for improving the training data set and/or testing data set are then provided such that the data set is more representative of the data network geographical influences. Once trained, the predictive algorithm may be utilized to predict customer behavior taking into account the influences of data network geography.

29 Claims, 4 Drawing Sheets

METHOD AND SYSTEM FOR PREDICTING CUSTOMER BEHAVIOR BASED ON DATA NETWORK GEOGRAPHY

CROSS REFERENCE TO RELATED APPLICATIONS

The present invention is related to the following applications entitled "METHOD AND SYSTEM FOR INTEGRATING SPATIAL ANALYSIS AND DATA MINING ANALYSIS TO ASCERTAIN FAVORABLE POSITIONING OF PRODUCTS IN A RETAIL ENVIRONMENT", U.S. application Ser. No. 09/400,583, "METHOD AND SYSTEM FOR INTEGRATING SPATIAL ANALYSIS AND DATA MINING ANALYSIS TO ASCERTAIN WARRANTY ISSUES ASSOCIATED WITH TRANSPORTATION PRODUCTS", U.S. application Ser. No. 09/401,109, and "METHOD AND SYSTEM FOR INTEGRATING SPATIAL ANALYSIS AND DATA MINING ANALYSIS TO ASCERTAIN RELATIONSHIPS BETWEEN COLLECTED SAMPLES AND GEOLOGY WITH REMOTELY SENSED DATA", U.S. application Ser. No. 09/400,776, all of which were filed Sep. 22, 1999, "METHOD AND SYSTEM FOR INTEGRATING SPATIAL ANALYSIS, DATA MINING ANALYSIS, AND SCHEDULING TO EFFICIENTLY SCHEDULE AND MONITOR INFRASTRUCTURE MAINTENANCE", U.S. application Ser. No. 09/619,408, filed on Jul. 19, 2000, and "METHOD AND SYSTEM FOR SAMPLE DATA SELECTION TO TEST AND TRAIN PREDICTIVE ALGORITHMS OF CUSTOMER BEHAVIOR", U.S. application Ser. No. 09/838,732, filed on Apr. 19, 2001, all of which are assigned to the same assignee, and incorporated herein by reference.

BACKGROUND OF THE INVENTION

1. Technical Field

The present invention relates to an improved data processing system. In particular, the present invention relates to a method and system for predicting customer behavior based on data network geography.

2. Description of Related Art

Currently, when using artificial intelligence algorithms to discover patterns in behavior exhibited by customers, it is necessary to create training data sets where a predicted outcome is known as well as testing data sets where the predicted outcome is known to be able to validate the accuracy of a predictive algorithm. The predictive algorithm, for example, may be designed to predict a customer's propensity to respond to an offer or his propensity to buy a product.

The data used to train and test the algorithm are selected using a random selection procedure, such as selecting data based upon a random number generator, or by some other means to insure that both the training data and test data sets are representative of the entire data population being evaluated. Tests of randomness of each of the attributes, e.g., the demographic information of the individuals, in the data sets can then be completed to see if they represent a randomly selected population.

While the above approach to selecting testing and training data sets may be suited for some applications, the purchasing behavior of customers is not only based on demographic and cyclographic information. Ease of access to various goods and services may also influence the customer's ultimate purchase patterns. That is, if a customer is able to obtain access to the goods and services more easily, the customer is typically more likely to engage in the purchase of such goods and services.

Today, customers are purchasing more and more goods and services over data networks, such as the Internet. In doing so, customers must often navigate a morass of web sites and web pages to ultimately arrive at the goods and services that they wish to purchase. This web sites and web pages that make up the data network are collectively referred to as the data network geography.

Many times, a customer may become frustrated during this navigating of the data network geography and may abandon the endeavor. Other times, the customer may simply purchase goods and services from the first web site or web page that they locate that provides the goods and services without bothering to look at other web sites that may offer the same goods and services under different terms, such as pricing, incentives, and the like.

Such influences on customer behavior by the data network geography are not taken into consideration when training and using predictive algorithms to predict customer behavior. Thus, bias may be introduced into either the test data, train data, or both data sets making either or both nonrepresentative of the overall customer database.

Therefore, it would be beneficial to have a method and system for correlating a customer's effort in navigating a data network with the customer's purchase behavior. It would further be beneficial to have a method and system for predicting a customer's behavior based on the geography of the data network. Furthermore, it would be beneficial to have a method and system for evaluating the training of a predictive algorithm to determine if the training and testing data sets do not adequately take into consideration the influences of the data network geography on customer behavior.

SUMMARY OF THE INVENTION

The present invention provides a method and system for predicting customer behavior based on the geography of a data network. The present invention further provides a method and system for evaluating the training of a predictive algorithm to determine if the algorithm does not adequately take into consideration the influences of data network geography.

The method and system generate frequency distributions of a customer database data set, training data set and testing data set and compare the frequency distributions of data network geographical characteristics to determine if there are discrepancies. If the discrepancies are above a predetermined tolerance, one or more of the data sets may not be representative of the customer database taking into account data network geographical influences on customer behavior. Thus, recommendations for improving the training data set and/or testing data set are then provided such that the data set is more representative of the data network geographical influences. Once trained, the predictive algorithm may be utilized to predict customer behavior taking into account the influences of data network geography.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
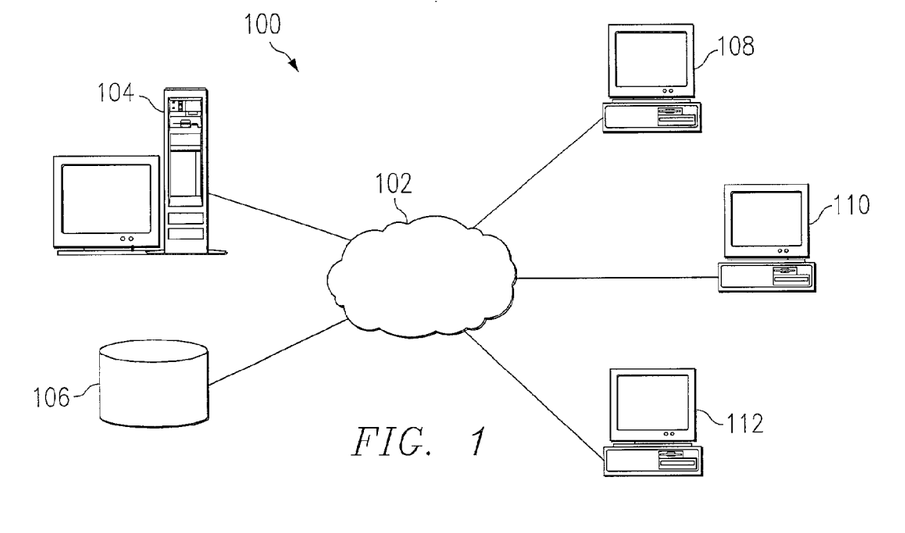
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers, customer behavior prediction devices, or the like. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

The present invention provides a method and apparatus for evaluating the selection of test and train data to determine if the test and train data accurately represent a geographical distribution of customers in a customer database. The present invention makes use of customer data that may be obtained from one or more sources in a distributed data processing system, such as distributed data processing system 100. For example, customer data may be obtained from retailer databases, third party data providers, and the like, which may be located remotely but accessible through the network 102.

The present invention may be implemented in a client device or a server. For example, the present invention may be implemented in a server, such as server 104, that obtains customer data from the various sources via the network 102. In response to a request from a client device, such as client device 112, the server 104 may evaluate test and train data for a predictive algorithm and provide guidance as to how to better select the test and train data to adjust the test and train data to be more geographically representative of the customer database.

Figure 2:
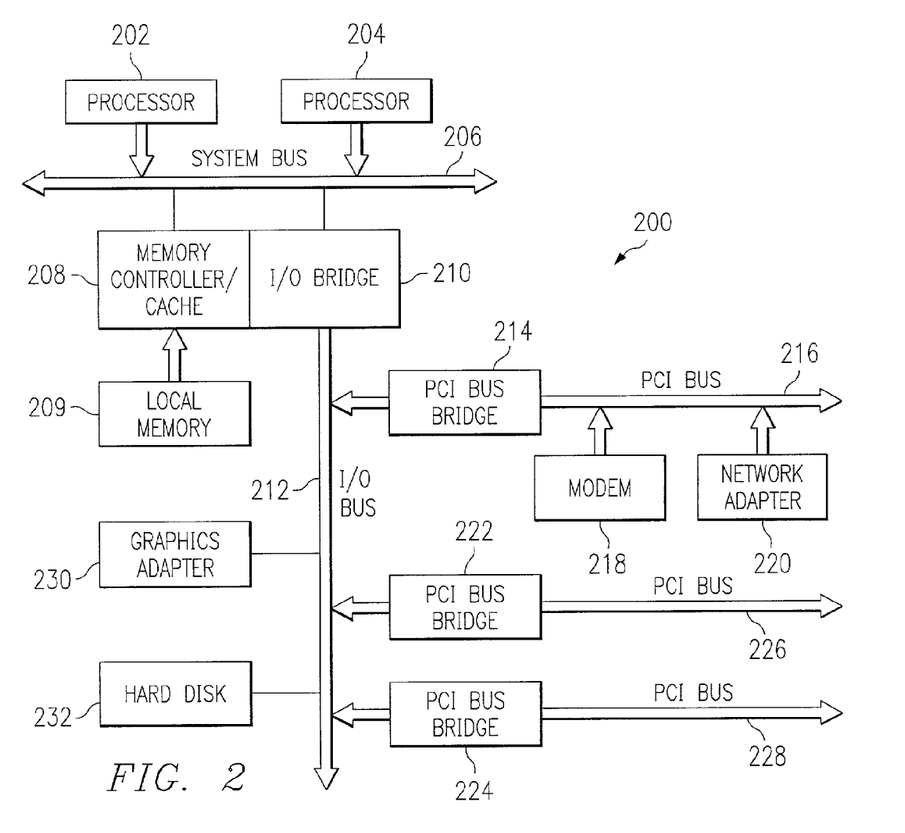
FIG. 2 is a block diagram illustrating a server data processing system in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
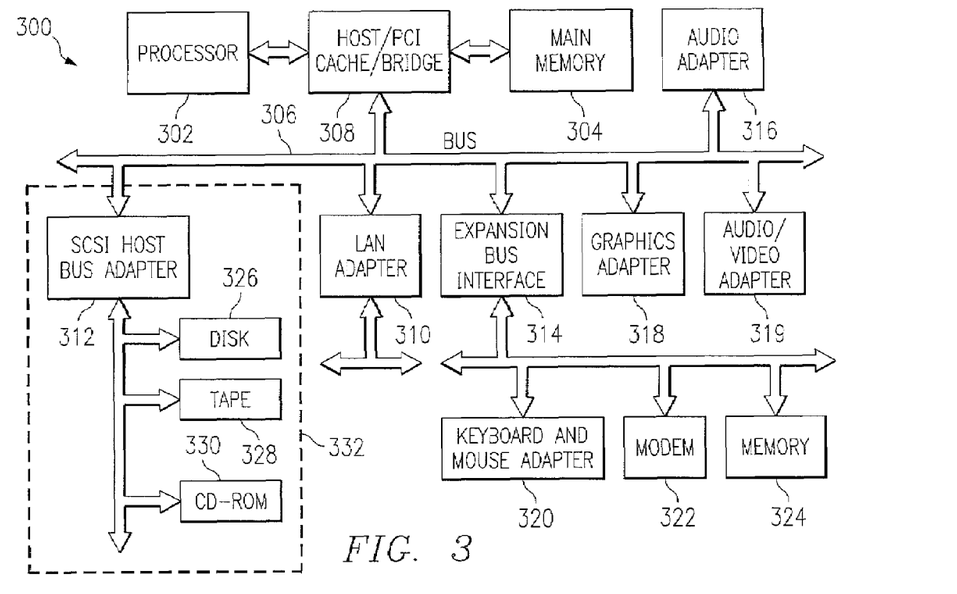
FIG. 3 is an exemplary block diagram of a client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a system and method for evaluating the data network geographical distributions of test and train data samples to provide a qualitative view of sampling bias. What is meant by "data network geography" is that there are certain links and a certain number of links between a customer's computing device and a reference point within the data network. A "link" is a transmission mechanism between two computing devices that allows communication between the two computing devices. A "link" may be a physical link, such as a wire, fibre optic cable, co-axial cable, or the like, or it may be a wireless link, such as a cellular or radio transmission link, a satellite link, or the like.

Customer's having the same links between them and the reference point are co-located. In looking at the data network as a plurality of links, a "geographic" position of each computing device in the data network may be determined based on the links, the number of links, their associated standard transmission delay, and the like. These features may be used to calculate a relative "distance" between the computing device and the reference point.

Furthermore, rather than looking at the specific links, the present invention may define data network geography in terms of a number of links. For example, if there are 1000 computing devices that have 10 links between them and the reference point, these computing devices are considered to be close to one another with regard to data network geography.

With the present invention, distributions of test and train data sets are identified and compared with each other and with a distribution of the entire customer database in order to ascertain randomness of the selection of the test and train data sets. The randomness of the selection of the test and train data sets with regard to data network geography may be ascertained by assessing the distribution of the amount of navigation (or data network interaction) that the customers must engage in to arrive at a particular web site or web page. Such navigation and interaction with the data network may be measured, for example, by the number of links that a customer must select, the number of web pages or redirects that the customer must be subjected to, the number of mouse clicks, the average search time for a customer to find and access the web site or web page, and the like.

If the normality of this distribution is compared with the test and train distributions, the representativeness of the three data sets, i.e. test, train and complete customer database, may be compared. That is, for example, a distribution of test data comprised of randomly selected customer data from the customer database may be compared to a distribution of a training data set of randomly selected customer data from the customer database, and both of these distributions may be compared to a distribution of the customer database, all with regard to data network geographical influences on the customer's behavior.

By comparing the mean, mode, and standard deviation plus plotting the data on a frequency distribution diagram to look at data distribution of data network navigation requirements in all three data sets, a determination as to whether the data sets are representative of the customer population with regard to data network geography may be made.

Finally, if there are competing web sites, a weighted data network navigation calculation may be made for each of the customers to ensure that the distribution of the customers in either data set is not biased with reference to competitor web sites or with the web site of interest. An easy way of establishing this relationship is to use the user "click stream" calculation as shown in the formula: ((((Number of mouse clicks to web site of choice(MCE))/(MCE+MC1+MC2 . . . MCN)))×100, where MC1, MC2 . . . are the number of mouse clicks to competitor web sites. The frequency distribution of these weighted user click streams may be compared in the same way as the individual data network navigation calculations where there is no specific identified competitor.

By testing for representative data network location parameters in these data sets when training the predictive algorithm, a more accurate predictive algorithm may be obtained for predicting customer behaviors. This is because often times data network geography may override other factors in customer decisions that may be modeled using demographic information. For example, although a customer may have a demographic profile that indicates the customer is a good candidate for buying a product from a web site, the amount of data network navigation or the size of the user click stream for the customer candidate to arrive at the web site or web page may be such that the customer candidate is dissuaded from navigating the data network to arrive at the web site to purchase the product. Thus, the data network geographical influence overrides the demographic influences. Such contention between data network geographic and demographic influences is not taken into consideration in known systems when selecting training and testing data sets or when predicting customer behavior.

Figure 4:
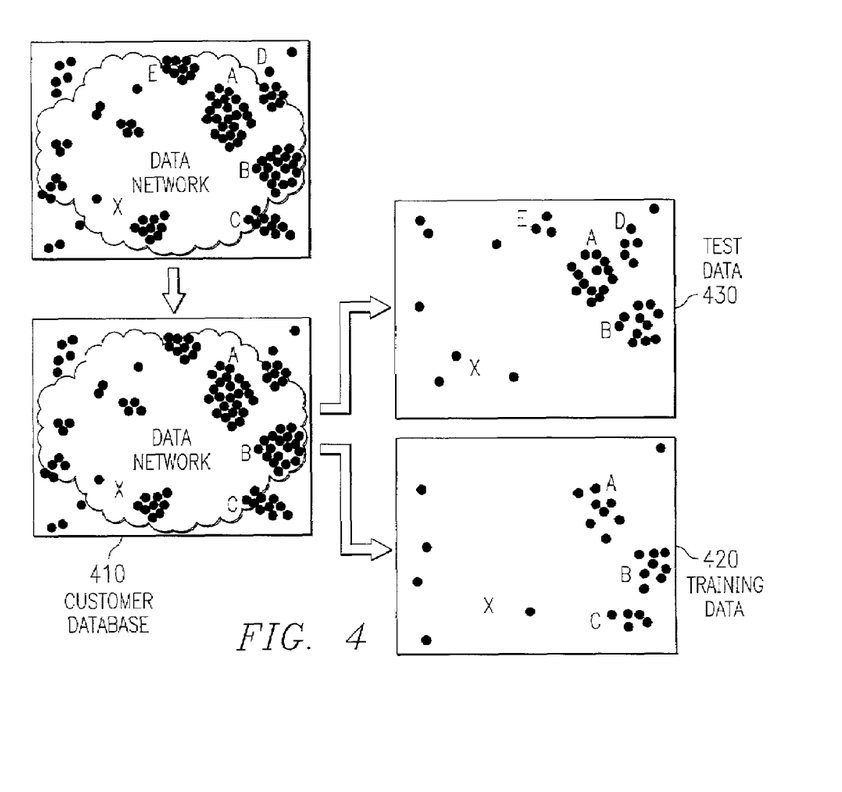
FIG. 4 is an exemplary diagram that depicts a process of obtaining test and training data from a customer database.

FIG. 4 is an exemplary block diagram illustrating a process of initially selecting test and train data for a predictive algorithm, such as a discovery based data mining algorithm. As shown in FIG. 4, a set of customers 400 for which information has been obtained are present in a data network geographical area. These customers 400 are geographically located in the data network in clusters due to their affiliation with other customers that navigate the data network in a similar manner or are geographically located in the data network near other customers. For example, customers that navigate the data network using similar type search terms may be required to traverse the same number, or close to the same number, of links in order to arrive at a destination web site or web page. Because of this, these customers may be geographically located close to one another in the data network since it requires the same amount of "travel distance" for these customers to arrive at other data network web sites.

From these customers 400 a customer database is generated 410. The customer database 410 may be generated, for example, by sending questionnaires to the customers and compiling responses from the customers 400, for example. Similarly, customer database 410 may be generated based on product warranty information submitted by the various customers. Alternatively, the customer database 410 may be obtained from publicly available information from various governmental or commercial sources. Other mechanisms for compiling and storing the customer database 410 may be used without departing from the spirit and scope of the present invention.

From the customer database 410, a set of training data 420 and testing data 430 are generated. In known systems, these sets of data 420 and 430 are generated using a random selection process, as previously described. Based on this random selection process, various ones of the customers in the customer database 410 are selected for inclusion into the training data set 420 and the testing data set 430.

As can be seen from FIG. 4, by selecting customers randomly from the customer database 410, it is possible that some of the clusters of customers may not be represented in the training and testing data sets 420 and 430. Moreover, the training data set 420 and the testing data set 430 may not be commonly representative of the same clusters of customers. In other words, the training data set 420 may contain customers from clusters 1 and 3 while the testing data set 430 may contain customers selected from clusters 1 and 2.

Because of the discrepancies between the training and testing data sets 420 and 430 with the customer database 410, certain types of customers may be over-represented and other types of customers may be under-represented. As a result, the predictive algorithm may not accurately represent the behavior of potential customers.

Moreover because of the discrepancies between the training and testing data sets 420 and 430, the predictive algorithm may be trained improperly. That is, the training data set 420 may train the predictive algorithm to output a particular predicted customer behavior based on a particular input. However, the testing data set 430 may indicate a different customer behavior based on the same input due to the differences in the customer clusters represented in the training data set 420 and the testing data set 430.

For example, as shown in FIG. 4, the training data set 420 is predominately comprised of customers from clusters A, B and C. Assume that customers in clusters A and B are very good customer candidates for a new electronic items while customers in group C are only mildly good customer candidates for new electronic items. Based on this training data, if a commercial web site at data network location X were interested in introducing a new electronic item, the predictive algorithm may indicate that there is a high likelihood of customer demand for the new electronic item from customers in clusters A and B.

However, in actuality, assume that customers in clusters A and B are less likely to navigate the data network from their data network location to the data network location X due to the amount of interaction required, i.e. the size of the user click stream. Thus, the predictive algorithm will provide an erroneous result.

Moreover, if the testing data contains customers from clusters A, B, D and E, the customer behaviors in the testing data will be different from that of customers in the training data set (comprising clusters A, B and C). As a result, the testing data and the training data are not consistent and erroneous customer behavior predictions will arise. Thus, data network geographic effects of clustering must be taken into account when selecting customers to be included in training and testing data sets of a customer behavior predictive algorithm.

With the present invention, the discrepancies between a testing data set and a training data set are identified. Furthermore, the discrepancies between both the testing data set and the training data set and the customer database are identified. The discrepancies are identified based on a data network geographical characteristic such as a number of links or the size of a user click stream. The normalized frequency distributions of the number of links and/or user click stream in the training data set are compared to the normalized frequency distributions of the testing data set. If the differences between the frequency distributions is above a predetermined tolerance, the two data sets are too different to provide accurate training of the predictive algorithm when taking data network geographical influences into account. This same procedure may be performed with regard to the frequency distribution of the customer database.

In order to compare the frequency distributions, the mean, mode and/or standard deviations of the frequency distributions may be compared with one another to determine if the frequency distributions are similar within a predetermined tolerance. The mean is a representation of the average of the frequency distribution. The mode is a representation of the most frequently occurring value in the data set. The standard deviation is a measure of dispersion in a set of data. Based on these quantities for each frequency distribution, a comparison of the frequency distributions may be made to determine if they adequately represent the customer population clusters in the customer database. If they do not, the present invention may, based on the relative discrepancies of the various data sets, make recommendations as to how to better select training and testing data sets that represent the data network geographic clustering of customers.

For example, if the relative discrepancy between a testing data set and a training data set are such that the training data set does not contain enough customers to represent all of the necessary clusters in the testing data set, the training data set may need to be increased in size. Similarly, if the testing data set and/or training data set do not contain enough customers to represent all of the clusters in the customer database, the testing and training data sets may need to be increased. In such cases, the same random selection algorithm may be used and the same seed value of the random selection algorithm may be used with the number of customers selected being increased.

Moreover, the testing data set and training data sets may be combined to form a composite data set which may be compared to the customer database. In combining the two data sets, customers appearing in a first data set, and not in the second data set, are added to the composite data set, and vice versa.

The frequency distribution of the composite data set may be compared to the frequency distribution of the customer database, in the manner described above, to determine if the composite represents the customer clusters appropriately. If the composite data set does represent the customer clusters of the customer database appropriately, the composite data set may be used to train the predictive algorithm. If the composite data set does not represent the customer clusters of the customer database appropriately, a new random selection algorithm may need to be used or a new seed value of a random selection algorithm may need to be used. In this way, the selection of training and testing data is modified such that the training and testing data better represents actual customer behavior based on data network geographical influences.

In a preferred embodiment of the present invention, the predictive algorithm is a discovery based data mining algorithm that is used to identify relationships between data. Data mining is an efficient mechanism for the discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

As a preferred embodiment of the present invention relies on the relatively new field of data mining and uses data mining algorithms, although other types of predictive algorithms may be used without departing from the spirit and scope of the present invention. In order to aid in the understanding of how data network geographic representation is important to predictive algorithms, and in particular to data mining, a discussion of the general techniques and purposes of data mining are herein provided.

Background on Data Mining

Data mining is a process for extracting relationships in data stored in database systems. As is well-known, users can query a database system for low-level information, such as an amount of money spent by a particular customer at a web site during the last month. Data mining systems, on the other hand, can build a set of high-level rules about a set of data, such as "If the customer is a white collar employee, and the age of the customer is over 30 years, and the amount of money spent by the customer on video games last year was above $100.00, then the probability that the customer will buy a video game in the next month is greater than 60%." These rules allow an owner/operator of a commercial web site to better understand the relationship between employment, age and prior spending habits and allows the owner/operator to make queries, such as "Where should I direct may direct mail advertisements?" This type of knowledge allows for targeted marketing and helps to guide other strategic decisions. Other applications of data mining include finance, market data analysis, medical diagnosis, scientific tasks, VLSI design, analysis of manufacturing processes, etc. Data mining involves many aspects of computing, including, but not limited to, database theory, statistical analysis, artificial intelligence, and parallel/distributed computing.

Data mining may be categorized into several tasks, such as association, classification, and clustering. There are also several knowledge discovery paradigms, such as rule induction, instance-based learning, neural networks, and genetic algorithms. Many combinations of data mining tasks and knowledge discovery paradigms are possible within a single application.

Data Mining Tasks

An association rule can be developed based on a set of data for which an attribute is determined to be either present or absent. For example, suppose data has been collected on a set of customers and the attributes are age and number of video games purchased last year. The goal is to discover any association rules between the age of the customer and the number of video games purchased.

Specifically, given two non-intersecting sets of items, e.g., sets X and Y, one may attempt to discover whether there is a rule "if X is 18 years old, then Y is 3 or more video games," and the rule is assigned a measure of support and a measure of confidence that is equal or greater than some selected minimum levels. The measure of support is the ratio of the number of records where X is 18 years old and Y is 3 or more video games, divided by the total number of records. The measure of confidence is the ratio of the number of records where X is 18 years old and Y is 3 or more video games, divided by the number of records where X is 18 years old. Due to the smaller number of records in the denominators of these ratios, the minimum acceptable confidence level is higher than the minimum acceptable support level.

Returning to video game purchases as an example, the minimum support level may be set at 0.3 and the minimum confidence level set at 0.8. An example rule in a set of video game purchase information that meets these criteria might be "if the customer is 18 years old, then the number of video games purchased last year is 3 or more."

Given a set of data and a set of criteria, the process of determining associations is completely deterministic. Since there are a large number of subsets possible for a given set of data and a large amount of information to be processed, most research has focused on developing efficient algorithms to find all associations. However, this type of inquiry leads to the following question: Are all discovered associations really significant? Although some rules may be interesting, one finds that most rules may be uninteresting since there is no cause and effect relationship. For example, the association "if the customer is 18 years old, then the number of video games purchased last year is 3 or more" would also be a reported association with exactly the same support and confidence values as the association "if the number of video games purchase is 3 or more, then the age of the customer is 18 years old."

Classification tries to discover rules that predict whether a record belongs to a particular class based on the values of certain attributes. In other words, given a set of attributes, one attribute is selected as the "goal," and one desires to find a set of "predicting" attributes from the remaining attributes. For example, suppose it is desired to know whether a particular customer will purchase a video game within the next month. For example, a rather trivial example of this type of rule could include "If the customer is 18 years old, there is a 25% chance the customer will purchase a video game within the next month."

A set of data is presented to the system based on past knowledge. This data "trains" the system. The present invention provides a mechanism by which such training data may be selected in order to better conform with actual customer behavior taking into account geographic influences. The goal is to produce rules that will predict behavior for a future class of data. The main task is to design effective algorithms that discover high quality knowledge. Unlike an association in which one may develop definitive measures for support and confidence, it is much more difficult to determine the quality of a discovered rule based on classification.

A problem with classification is that a rule may, in fact, be a good predictor of actual behavior but not a perfect predictor for every single instance. One way to overcome this problem is to cluster data before trying to discover classification rules. To understand clustering, consider a simple case were two attributes are considered: age and number of video games purchased last year. These data points can be plotted on a two-dimensional graph. Given this plot, clustering is an attempt to discover or "invent" new classes based on groupings of similar records. For example, for the above attributes, a clustering of data in the range of 17-20 years old for customer age might be found for 1-4 video games purchased last year. This cluster could then be treated as a single class.

Clusters of data represent subsets of data where members behave similarly but not necessarily the same as the entire population. In discovering clusters, all attributes are considered equally relevant. Assessing the quality of discovered clusters is often a subjective process. Clustering is often used for data exploration and data summarization.

Knowledge Discovery Paradigms

There are a variety of knowledge discovery paradigms, some guided by human users, e.g. rule induction and decision trees, and some based on AI techniques, e.g. neural networks. The choice of the most appropriate paradigm is often application dependent.

On-line analytical processing (OLAP) is a database-oriented paradigm that uses a multidimensional database where each of the dimensions is an independent factor, e.g., customer vs. video games purchased vs. income level. There are a variety of operators provided that are most easily understood if one assumes a three-dimensional space in which each factor is a dimension of a vector within a three-dimensional cube. One may use "pivoting" to rotate the cube to see any desired pair of dimensions. "Slicing" involves a subset of the cube by fixing the value of one dimension. "Roll-up" employs higher levels of abstraction, e.g. moving from video games bought-by-age to video games bought-by-income level, and drill-down goes to lower levels, e.g. moving from video games bought-by-age to video games bought-by-gender.

The Data Cube operation computes the power set of the group by operation provided by SQL. For example, given a three dimension cube with dimensions A, B, C, then Data Cube computes Group by A, Group by B, Group by C, Group by A.B., Group by A.C., Group by B.C., and Group by A,B,C. OLAP is used by human operators to discover previously undetected knowledge in the database.

Recall that classification rules involve predicting attributes and the goal attribute. Induction on classification rules involves specialization, i.e. adding a condition to the rule antecedent, and generalization, i.e. removing a condition from the antecedent. Hence, induction involves selecting what predicting attributes will be used. A decision tree is built by selecting the predicting attributes in a particular order, e.g., customer age, video games purchased last year, income level.

The decision tree is built top-down assuming all records are present at the root and are classified by each attribute value going down the tree until the value of the goal attribute is determined. The tree is only as deep as necessary to reach the goal attribute. For example, if no customers of age 2 bought video games last year, then the value of the goal attribute "number of video games purchase last year?" would be determined (value equals "0") once the age of the customer is known to be 2. However, if the age of the customer is 7, it may be necessary to look at other predicting attributes to determine the value of the goal attribute. A human is often involved in selecting the order of attributes to build a decision tree based on "intuitive" knowledge of which attribute is more significant than other attributes.

Decision trees can become quite large and often require pruning, i.e. cutting off lower level subtrees. Pruning avoids "overfitting" the tree to the data and simplifies the discovered knowledge. However, pruning too aggressively can result in "underfitting" the tree to the data and missing some significant attributes.

The above techniques provide tools for a human to manipulate data until some significant knowledge is discovered and removes some of the human expert knowledge interference from the classification of values. Other techniques rely less on human intervention. Instance-based learning involves predicting the value of a tuple, e.g., predicting if someone of a particular age and gender will buy a product, based on stored data for known tuple values. A distance metric is used to determine the values of the N closest neighbors, and these known values are used to predict the unknown value.

The final technique examined is neural nets. A typical neural net includes an input layer of neurons corresponding to the predicting attributes, a hidden layer of neurons, and an output layer of neurons that are the result of the classification. For example, there may be eight input neurons corresponding to "under 3 video games purchase last year", "between 3 and 6 video games purchase last year", "over 6 video games purchased last year", "in Plano, Tex.", "customer age below 10 years old", "customer age above 18 years old", and "customer age between 10 and 18 years old." There could be two output neurons: "will purchase video game within next month" and "will not purchase video game within next month". A reasonable number of neurons in the middle layer is determined by experimenting with a particular known data set.

There are interconnections between the neurons at adjacent layers that have numeric weights. When the network is trained, meaning that both the input and output values are known, these weights are adjusted to give the best performance for the training data. The "knowledge" is very low level (the weight values) and is distributed across the network. This means that neural nets do not provide any comprehensible explanation for their classification behavior-they simply provide a predicted result.

Neural nets may take a very long time to train, even when the data is deterministic. For example, to train a neural net to recognize an exclusive- or relationship between two Boolean variables may take hundreds or thousands of training data (the four possible combinations of inputs and corresponding outputs repeated again and again) before the neural net learns the circuit correctly. However, once a neural net is trained, it is very robust and resilient to noise in the data. Neural nets have proved most useful for pattern recognition tasks, such as recognizing handwritten digits in a zip code.

Other knowledge discovery paradigms can be used, such as genetic algorithms. However, the above discussion presents the general issues in knowledge discovery. Some techniques are heavily dependent on human guidance while others are more autonomous. The selection of the best approach to knowledge discovery is heavily dependent on the particular application.

Data Warehousing

The above discussions focused on data mining tasks and knowledge discovery paradigms. There are other components to the overall knowledge discovery process.

Data warehousing is the first component of a knowledge discovery system and is the storage of raw data itself. One of the most common techniques for data warehousing is a relational database. However, other techniques are possible, such as hierarchical databases or multidimensional databases. No matter which type of database is used, it should be able to store points, lines, and polygons such that geographic distributions can be assessed. This type of warehouse or database is sometimes referred to as a spatial data warehouse.

Data is nonvolatile, i.e. read-only, and often includes historical data. The data in the warehouse needs to be "clean" and "integrated". Data is often taken from a wide variety of sources. To be clean and integrated means data is represented in a consistent, uniform fashion inside the warehouse despite differences in reporting the raw data from various sources.

There also has to be data summarization in the form of a high level aggregation. For example, consider a phone number 111-222-3333 where 111 is the area code, 222 is the exchange, and 3333 is the phone number. The telephone company may want to determine if the inbound number of calls is a good predictor of the outbound number of calls. It turns out that the correlation between inbound and outbound calls increases with the level of aggregation. In other words, at the phone number level, the correlation is weak but as the level of aggregation increases to the area code level, the correlation becomes much higher.

Data Pre-processing

After the data is read from the warehouse, it is pre-processed before being sent to the data mining system. The two pre-processing steps discussed below are attribute selection and attribute discretization.

Selecting attributes for data mining is important since a database may contain many irrelevant attributes for the purpose of data mining, and the time spent in data mining can be reduced if irrelevant attributes are removed beforehand. Of course, there is always the danger that if an attribute is labeled as irrelevant and removed, then some truly interesting knowledge involving that attribute will not be discovered.

If there are N attributes to choose between, then there are $2^N$ possible subsets of relevant attributes. Selecting the best subset is a nontrivial task. There are two common techniques for attribute selection. The filter approach is fairly simple and independent of the data mining technique being used. For each of the possible predicting attributes, a table is made with the predicting attribute values as rows, the goal attribute values as columns, and the entries in the table as the number of tuples satisfying the pairs of values. If the table is fairly uniform or symmetric, then the predicting attribute is probably irrelevant. However, if the values are asymmetric, then the predicting attribute may be significant.

The second technique for attribute selection is called a wrapper approach where attribute selection is optimized for a particular data mining algorithm. The simplest wrapper approach is Forward Sequential Selection. Each of the possible attributes is sent individually to the data mining algorithm and its accuracy rate is measured. The attribute with the highest accuracy rate is selected. Suppose attribute 3 is selected; attribute 3 is then combined in pairs with all remaining attributes, i.e., 3 and 1, 3 and 2, 3 and 4, etc., and the best performing pair of attributes is selected.

This hill climbing process continues until the inclusion of a new attribute decreases the accuracy rate. This technique is relatively simple to implement, but it does not handle interaction among attributes well. An alternative approach is backward sequential selection that handles interactions better, but it is computationally much more expensive.

Discretization involves grouping data into categories. For example, age in years might be used to group persons into categories such as minors (below 18), young adults (18 to 39), middle-agers (40-59), and senior citizens (60 or above). Some advantages of discretization is that it reduces the time for data mining and improves the comprehensibility of the discovered knowledge. Categorization may actually be required by some mining techniques. A disadvantage of discretization is that details of the knowledge may be suppressed.

Blindly applying equal-weight discretization, such as grouping ages by 10 year cycles, may not produce very good results. It is better to find "class-driven" intervals. In other words, one looks for intervals that have uniformity within the interval and have differences between the different intervals.

Data Post-processing

The number of rules discovered by data mining may be overwhelming, and it may be necessary to reduce this number and select the most important ones to obtain any significant results. One approach is subjective or user-driven. This approach depends on a human's general impression of the application domain. For example, the human user may propose a rule such as "if a customer's age is less than 18, then the customer has a higher likelihood of purchasing a video game." The discovered rules are then compared against this general impression to determine the most interesting rules. Often, interesting rules do not agree with general expectations. For example, although the conditions are satisfied, the conclusion is different than the general expectations. Another example is that the conclusion is correct, but there are different or unexpected conditions.

Rule affinity is a more mathematical approach to examining rules that does not depend on human impressions. The affinity between two rules in a set of rules $\{R_1\}$ is measured and given a numerical affinity value between zero and one, called Af $(R_x, R_y)$. The affinity value of a rule with itself is always one, while the affinity with a different rule is less than one. Assume that one has a quality measure for each rule in a set of rules $\{R_i\}$, called $Q(R_i)$. A rule $R_j$ is said to be suppressed by a rule $R_k$ if $Q(R_j) < Af(R_j, R_k) * Q(R_k)$. Notice that a rule can never be suppressed by a lower quality rule since one assumes that $Af(R_j, R_k) < 1$ if $j^1$ k. One common measure for the affinity function is the size of the intersection between the tuple sets covered by the two rules, i.e. the larger the intersection, the greater the affinity.

Data Mining Summary

The discussion above has touched on the following aspects of knowledge processing: data warehousing, pre-processing data, data mining itself, and post-processing to obtain the most interesting and significant knowledge. With large databases, these tasks can be very computationally intensive, and efficiency becomes a major issue. Much of the research in this area focuses on the use of parallel processing. Issues involved in parallelization include how to partition the data, whether to parallelize on data or on control, how to minimize communications overhead, how to balance the load between various processors, how to automate the parallelization, how to take advantage of a parallel database system itself, etc.

Many knowledge evaluation techniques involve statistical methods or artificial intelligence or both. The quality of the knowledge discovered is highly application dependent and inherently subjective. A good knowledge discovery process should be both effective, i.e. discovers high quality knowledge, and efficient, i.e. runs quickly.

Figure 5A:
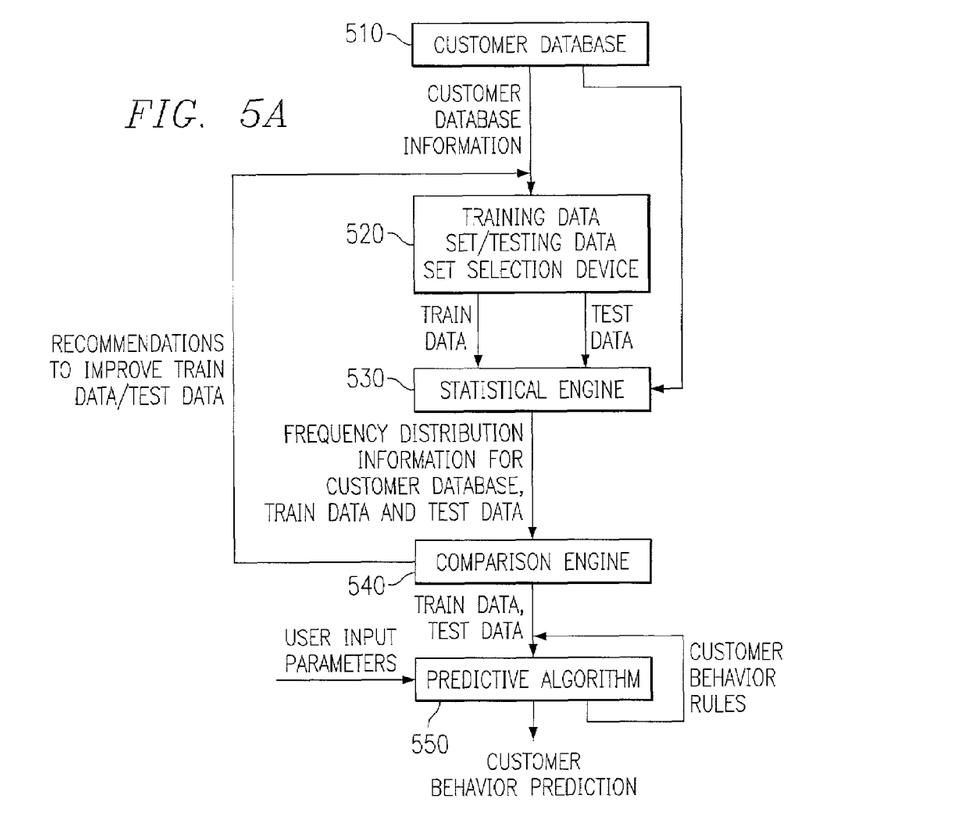
FIG. 5A is a block diagram depicting a data flow between the elements that may be used to select testing and training data sets in accordance with the present invention.

FIG. 5A is an exemplary block diagram depicting a data flow of an apparatus for selecting training and testing data sets for use with a predictive algorithm, in accordance with a preferred embodiment of the present invention. As shown in FIG. 5, the apparatus includes a customer database 510, a training data set/testing data set selection device 520, a statistical engine 530, a comparison engine 540, and a predictive algorithm 550. The elements shown in FIG. 5A may be implemented as software, hardware, or a combination of software and hardware. For example, the elements of FIG. 5A may be implemented as software instructions executed by a processor, such as processor 202 in FIG. 2, of a server apparatus. Alternatively, the elements shown in FIG. 5A may be distributed across a plurality of devices such as a client device and one or more server devices.

The customer database 510 provides customer database information to both the training data set/testing data set selection device 520 as well as the statistical engine 530. The training data set/testing data set selection device 520 selects a training data set and a testing data set from the customer database information and inputs the training data set and the testing data set to the statistical engine 530. The testing data set and training data set may be selected in any known manner. For example, the testing data set and training data set may be selected using a random selection algorithm, or the like.

The statistical engine 530 receives the training data set, testing data set and customer database information and generates statistical information regarding the frequency distributions of number of links and/or user click streams to a web site of interest for each data set. Such information may be, for example, the mean, mode, standard deviation, and the like. The number of links and/or user click stream may be generated in any known manner, may be obtained from an information supplier via a network, or the like, for example. This frequency distribution information is then output to the comparison engine 540. The mathematical processes for computing frequency distributions, means, modes and standard deviations are generally known in the art.

The comparison engine 540 compares and evaluates the frequency distribution information obtained from the statistical engine 530 to determine if the testing data set and training data sets are geographically representative of the customer population within the data network. Such comparison and evaluation may include, for example, determining a difference in frequency distribution information and determining if the difference is beyond a predetermined tolerance. Based on the results of the comparison and evaluation, the comparison engine generates recommendations regarding how to improve the representativeness of the testing data set and training data set. For example, if a difference in frequency distribution information of the testing and training data sets is beyond a predetermined tolerance, a different seed value for one or both of the algorithms for generating the training and testing data may be selected. If the difference between the frequency distribution information for the training data set and/or the testing data set, and the customer database is beyond a predetermined tolerance, then a new random selection algorithm may be required. Alternatively, as discussed above, a composite data set may be generated and used as a basis for comparison with the customer database frequency distribution information.

Figure 5B:
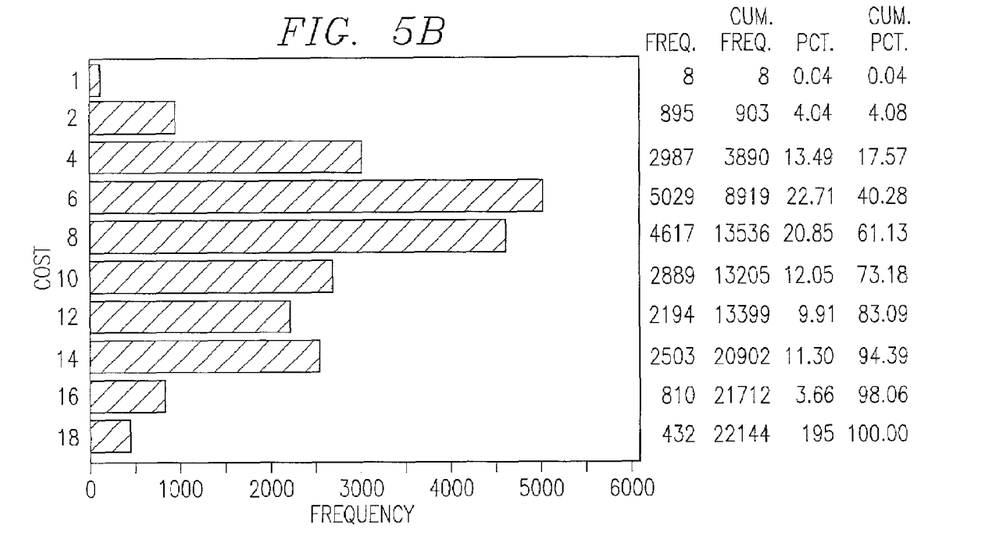
FIG. 5B represents an exemplary training data set frequency diagram in accordance with the present invention.
Figure 5C:
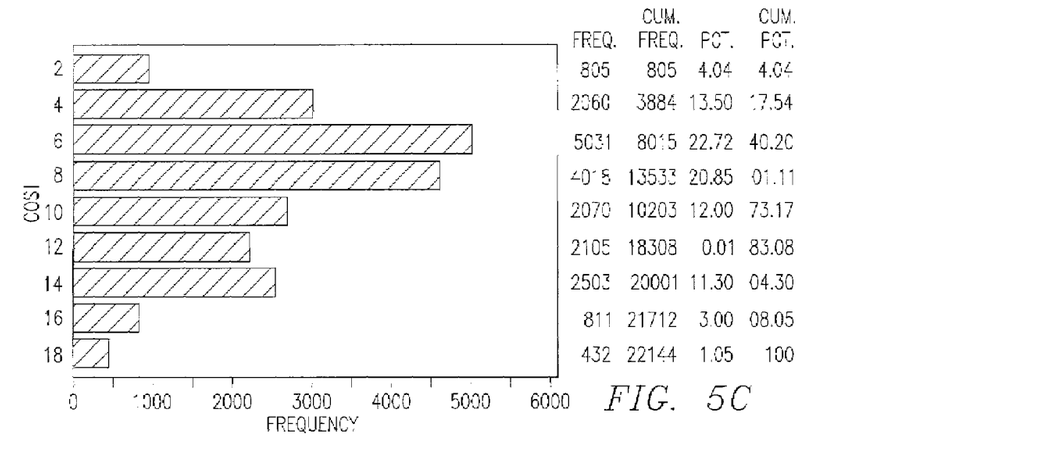
FIG. 5C represents an exemplary testing data set frequency diagram in accordance with the present invention.

If the results of the comparison engine 540 indicate that the training data set and testing data set adequately reflect the data network geographical distribution of the customer population, the training data set and testing data set may be output to the predictive algorithm 540. FIGS. 5B and 5C represent training and testing data sets in accordance with the present invention.

The predictive algorithm may then use the training data set and testing data set to train itself and generate customer behavior rules. Thereafter, if a user inputs request parameters for requesting a prediction of customer behavior, the customer behavior rules will be applied to the input parameters and a customer behavior prediction will be output.

Figure 6:
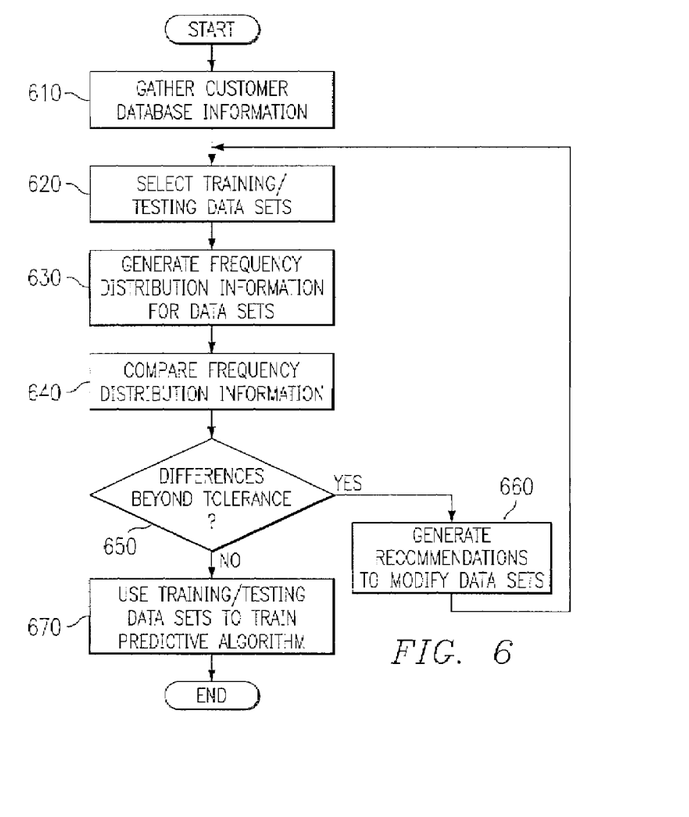
FIG. 6 is a flowchart depicting a process for test/train data set selection for use with discovery based data mining in customer relationship marketing.

FIG. 6 is a flowchart outlining an exemplary operation of the present invention. As shown in FIG. 6, the operation starts with gathering customer database information (step 610). The customer database information is then used as a basis for selecting a training data set and/or testing data set (step 620). Frequency distribution information of a number of data network links and/or user click stream to a web site of interest is calculated for each of the training data set, testing data set and customer database data set (step 630). The frequency distribution information for each of these data sets is compared and evaluated to determine if differences exceed a predetermined tolerance (step 640).

A determination is made as to whether differences in the frequency distribution information is beyond a predetermined tolerance (step 650). If so, recommendations are generated based on the particular differences (step 660) and the operation returns to step 620 where the training and testing data sets are again determined in view of the recommendations. If the differences in frequency distribution information are not beyond the predetermined tolerance, the training data set and testing data set are used to train the predictive algorithm (step 670) and the operation ends. Thereafter, the predictive algorithm may be used to generate customer behavior predictions taking into account the data network geographical influences of customers as represented in the training and testing data sets.

Thus, the present invention provides a mechanism by which data network geographical influences on customer behavior may be taken into account when selecting training data and testing data for training a predictive algorithm of customer behavior. The present invention further provides a predictive algorithm for predicting customer behavior based on demographic and cyclographic information as well as data network geographic information.

While the above exemplary embodiments of the present invention involve evaluating the testing and training data for training a predictive algorithm, the present invention need not include such evaluation. Rather, the present invention further provides a predictive algorithm in which customer data includes data network geographical information as well as one or more of demographic and cyclographic information regarding customers. The predictive algorithm may then use data network geographical information in addition to the demographic and/or cyclographic information to ascertain customer behavior, as described earlier.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing machine implemented method of selecting data sets for use with a predictive algorithm based on data network geographical information, comprising data processing machine implemented steps of:
    generating, by the data processing machine, a first statistical distribution of a training data set;
    generating, by the data processing machine, a second statistical distribution of a testing data set;
    using, by the data processing machine, the first statistical distribution and the second statistical distribution to identify a discrepancy between the first statistical distribution and the second statistical distribution with respect to the data network geographical information by comparing at least one of the first statistical distribution and the second statistical distribution to a statistical distribution of a customer database to determine if at least one of the training data set and the testing data set are geographically representative of a customer population represented by the customer database;
    modifying, by the data processing machine, selection of entries in one or more of the training data set and the testing data set based on the discrepancy between the first statistical distribution and the second statistical distribution; and
    using the modified selection of entries by the predictive algorithm.

2. The method of claim 1, wherein the first statistical distribution and the second statistical distribution are distributions of a number of data network links from a customer data network geographical location to a web site data network geographical location.

3. The method of claim 1, wherein the first statistical distribution and the second statistical distribution are distributions of a size of a click stream for arriving at a web site data network geographical location.

4. The method of claim 1, wherein comparing the first statistical distribution and the second statistical distribution includes comparing one or more of a mean, mode, and standard deviation of the first statistical distribution to one or more of a mean, mode, and standard deviation of the second statistical distribution.

5. The method of claim 1, wherein the first statistical distribution and the second statistical distribution are distributions of a weighted data network geographical distance between a customer data network geographical location and a web site data network geographical locations.

6. The method of claim 1, wherein the first statistical distribution and the second statistical distribution are distributions of a weighted click stream for arriving at a web site data network geographical locations.

7. The method of claim 1, wherein modifying selection of entries in one or more of the training data set and the testing data set includes generating recommendations for improving selection of entries in one or more of the training data set and the testing data set, and wherein the method of claim 1 further comprises re-generating at least one of the first statistical distribution and the second statistical distribution based upon the recommendations.

8. The method of claim 1, wherein the training data set and the testing data set are selected from a customer information database comprising information with respect to customers who have purchased any of goods and services over a data network, wherein the data network geographic information pertains to geographic information of the data network.

9. The method of claim 1, wherein the first statistical distribution and second statistical distribution are frequency distributions of number of data network links between a customer geographical location and one or more web site data network geographical locations, and size of a click stream for arriving at one or more web site data network geographical locations.

10. The method of claim 1, wherein comparing at least one of the first statistical distribution and the second statistical distribution to a statistical distribution of a customer database includes: generating a composite data set from the training data set and the testing data set; and
    generating a composite statistical distribution from the composite data set that was generated from the training data set and the testing data set.

11. The method of claim 1, wherein modifying selection of entries in one or more of the training data set and the testing data set includes changing one of a random selection algorithm and a seed value for the random selection algorithm, and then re-comparing the first statistical distribution and the second statistical distribution.

12. The method of claim 1, wherein using the modified selection of entries by the predictive algorithm includes training the predictive algorithm using at least one of the training data set and the testing data set if the discrepancy is within a predetermined tolerance.

13. The method of claim 12, wherein the predictive algorithm is a discovery based data mining algorithm.

14. An apparatus for selecting data sets for use with a predictive algorithm based on data network geographical information, comprising:
    a statistical engine;
    a comparison engine coupled to the statistical engine, wherein the statistical engine generates a first statistical distribution of a training data set and a second distribution of a testing data set, the comparison engine uses the first statistical distribution and the second distribution to identify a discrepancy between the first statistical distribution and the second distribution with respect to the data network geographical information by comparing at least one of the first statistical distribution and the second statistical distribution to a statistical distribution of a customer database to determine if at least one of the training data set and the testing data set are geographically representative of a customer population represented by the customer database, modifies selection of entries in one or more of the training data set and the testing data set based on the discrepancy between the first statistical distribution and the second distribution, and provides the modified selection of entries for use by the predictive algorithm; and
    a predictive algorithm device that uses the modified selection of entries and the predictive algorithm.

15. The apparatus of claim 14, wherein the first statistical distribution and the second statistical distribution are distributions of a number of data network links from a customer data network geographical location to a web site data network geographical location.

16. The apparatus of claim 14, wherein the first statistical distribution and the second statistical distribution are distributions of a size of a click stream to arrive at a web site data network geographical location.

17. The apparatus of claim 14, wherein the comparison engine compares the first statistical distribution and the second statistical distribution by comparing one or more of a mean, mode, and standard deviation of the first statistical distribution to one or more of a mean, mode, and standard deviation of the second statistical distribution.

18. The apparatus of claim 14, wherein the first statistical distribution and the second statistical distribution are distributions of a weighted number of data network links between a customer data network geographical location and a web site data network geographical location.

19. The apparatus of claim 14, wherein the first statistical distribution and the second statistical distribution are distributions of a weighted size of a click stream to arrive at a web site data network geographical location.

20. The apparatus of claim 14, wherein the comparison engine modifies selection of entries in one or more of the training data set and the testing data set by generating recommendations for improving selection of entries in one or more of the training data set and the testing data set, and wherein the statistical engine re-generates at least one of the first statistical distribution and the second statistical distribution based upon the recommendations.

21. The apparatus of claim 14, further comprising a training data set/testing data set selection device that selects the training data set and the testing data set from a customer information database comprising information with respect to customers who have purchased any of goods and services over a data network, wherein the data network geographic information pertains to geographic information of the data network.

22. The apparatus of claim 14, wherein the first statistical distribution and second statistical distribution are frequency distributions of a number of data network links between a customer data network geographical location and one or more web site data network geographical locations, and a size of a click stream to arrive at one or more web site data network geographical locations.

23. The apparatus of claim 14, wherein the comparison engine compares at least one of the first statistical distribution and the second statistical distribution to a statistical distribution of a customer database by:
generating a composite data set from the training data set and the testing data set; and
generating a composite statistical distribution from the composite data set that was generated from the training data set and the testing data set.

24. The apparatus of claim 14, wherein the comparison engine modifies selection of entries in one or more of the training data set and the testing data set by changing one of a random selection algorithm and a seed value for the random selection algorithm, and then re-comparing the first statistical distribution and the second statistical distribution.

25. The apparatus of claim 14, wherein the predictive algorithm device is trained using at least one of the training data set and the testing data set if the discrepancy is within a predetermined tolerance.

26. The apparatus of claim 25, wherein the predictive algorithm is a discovery based data mining algorithm.

27. A data processing machine implemented method of predicting customer behavior based on data network geographical influences, comprising data processing machine implemented steps of:
obtaining data network geographical information regarding a plurality of customers, the data network geographic information comprising frequency distributions of both (i) number of data network links between a customer geographical location and one or more web site data network geographical locations, and (ii) size of a click stream for arriving at the one or more web site data network geographical locations; training a predictive algorithm using the data network geographical information; and using the predictive algorithm to predict customer behavior based on the data network geographical information.

28. An apparatus for predicting customer behavior based on data network geographical influences, comprising:
means for obtaining data network geographical information regarding a plurality of customers, the data network geographic information comprising frequency distributions of both (i) number of data network links between a customer geographical location and one or more web site data network geographical locations, and (ii) size of a click stream for arriving at the one or more web site data network geographical locations;
means for training a predictive algorithm using the data network geographical information; and
means for using the predictive algorithm to predict customer behavior based on the data network geographical information.

29. A computer program product in a computer readable medium comprising instructions for enabling a data processing machine to predict customer behavior based on data network geographical influences, comprising:
first instructions for obtaining data network geographical information regarding a plurality of customers, the data network geographic information comprising frequency distributions of both (i) number of data network links between a customer geographical location and one or more web site data network geographical locations, and (ii) size of a click stream for arriving at the one or more web site data network geographical locations;
second instructions for training a predictive algorithm using the data network geographical information; and
third instructions for using the predictive algorithm to predict customer behavior based on the data network geographical information.

\* \* \* \* \*